US005947154A

United States Patent [19]

Fischer

[11] Patent Number: 5,947,154

[45] Date of Patent: Sep. 7, 1999

[54] CONTAINER FOR LIQUIDS

[76] Inventor: Friedrich Fischer, Allermöher Deich 35, D-21037 Hamburg, Germany

[21] Appl. No.: 08/793,544

[22] PCT Filed: Jul. 21, 1995

[86] PCT No.: PCT/EP95/02874

§ 371 Date: Jan. 27, 1997

§ 102(e) Date: Jan. 27, 1997

[87] PCT Pub. No.: WO96/03325

PCT Pub. Date: Feb. 8, 1996

[30] Foreign Application Priority Data

Jul. 27, 1994 [DE] Germany ............................ 44 26 574

[51] Int. Cl.$^{6}$ ................................................ F16K 24/00

[52] U.S. Cl. ......................... 137/589; 137/572; 137/587; 251/149.6

[58] Field of Search ............................ 251/149.4, 149.6; 137/587, 572, 589

[56] References Cited

U.S. PATENT DOCUMENTS

| | | | |
|---|---|---|---|
| 151,473 | 6/1874 | Christmas | 137/587 |
| 264,177 | 9/1882 | Luhrs | 137/587 |
| 620,262 | 2/1899 | Tong | 137/589 X |
| 1,551,407 | 8/1925 | Kincannon | 137/589 |
| 1,992,319 | 2/1935 | Maggenti | 137/589 X |
| 2,054,488 | 9/1936 | Sinks . | |
| 3,187,770 | 6/1965 | Plamann | 137/589 |
| 3,387,621 | 6/1968 | Schaff . | |
| 3,720,287 | 3/1973 | Martel . | |
| 3,879,013 | 4/1975 | Hajek, Jr. | 251/149.6 |
| 3,981,325 | 9/1976 | Robinson et al. | 137/587 |
| 3,999,567 | 12/1976 | Robinson | 137/589 X |
| 4,063,708 | 12/1977 | Smith | 251/149.6 |
| 4,150,809 | 4/1979 | Muller | 251/149.6 |
| 4,718,452 | 1/1988 | Maitland | 137/587 |
| 4,722,463 | 2/1988 | Anderson . | |
| 4,746,036 | 5/1988 | Messner | 137/587 |

FOREIGN PATENT DOCUMENTS

| | | | |
|---|---|---|---|
| 515772 | 12/1952 | Belgium . | |
| 1257322 | 12/1961 | France . | |
| 2354293 | 10/1972 | Germany . | |
| 3921319 A1 | 1/1991 | Germany . | |
| 8901269 | 12/1990 | Netherlands . | |
| 3428 | 12/1914 | United Kingdom | 137/587 |

*Primary Examiner*—John Rivell
*Assistant Examiner*—Meredith H. Schoenfeld
*Attorney, Agent, or Firm*—Harness, Dickey & Pierce, P.L.C.

[57] ABSTRACT

The container is used for liquids and is equipped with an outlet to which a discharge hose with an interior hose space can be connected. The outlet is disposed in a container wall which encloses an interior space of the container. In the region of the outlet, a through-passage which leads to the interior space of the container, is disposed. The outlet is connected to a two-position valve which has at least two control positions. A discharge position and an aerating position are being provided. In the discharge position, the two-position valve connects the interior space of the container to the interior space of the hose. In the aerating position, the end of the discharge hose, which faces the interior space of the container, is connected to an area outside the container by means of the two-position valve.

22 Claims, 6 Drawing Sheets

CONTAINER FOR LIQUIDS

BACKGROUND AND SUMMARY OF THE INVENTION

The invention concerns a container for liquids, which is equipped with an outlet, to which a discharge hose having an interior hose space can be connected, and where the outlet is located in a container wall, which encloses an interior space of the container, and where in the region of the outlet a through-passage leading to the interior space of the container is disposed.

In addition to this, the invention concerns a container for liquids, which is equipped with an outlet, which opens into an interior space of the container in a region of the lower extension of a container wall in a vertically downward direction, and where the outlet can be closed off by means of a closing element.

During the handling of liquids which are stored in containers, the problem arises, that when the liquid is poured out of the container, the volume inside the container, which had previously been occupied by the liquid, must now be replaced by air from the area outside the container. When the liquid is poured out in the usual manner, the air enters the container in the form of bubbles as a result of the negative pressure, which is generated inside the container as a consequence of the pouring process. This results in an erratic pouring behavior. A further problem can be observed when a discharge hose is attached to the container. If in the use of such a discharge hose a closing element is disposed in the region where the hose enters the container, the volume of liquid, which is present inside the hose, runs out of the hose at a slow rate and air bubbles enter the hose in a direction opposite to that of the direction of discharge. Such a discharge of the hose takes a relatively long time, and furthermore, as a result of the erratic discharge behavior caused by the air bubbles, a contamination of the environment by spilled liquid can be expected.

When containers are emptied, which can be closed off by means of a closing element in the region of their lower vertical extension, for example, when objects containing oil are emptied, a problem arises due to the fact that the liquid is discharged immediately after the closing element is opened. For example, if used oil is discharged from the engine of a vehicle in which the closing element is constructed in the form of an oil drain plug, which is located in the region of the oil pan of the vehicle, the oil is discharged immediately after the oil drain plug is removed. Due to the threads of the oil drain plug the time of the complete separation of the oil drain plug from the oil pan is not exactly predictable, so that nearly every time when oil is discharged contamination occurs. A multiplicity of accidents was, moreover, caused by the fact that the oil drain plug had not been reconnected sufficiently tightly to the oil pan after the oil change process had been terminated.

In order to make it easier to empty the container while it is in an ergonomically favorable position, it is proposed that the outlet be disposed in a vertically lower region of the container.

It will be made easier to substantially empty the container if the two-position valve is disposed in a vertically lower region of the interior of the container.

An embodiment, which can be easily produced mechanically, consists in providing a tube for the actuation of the two-position valve, which tube is extended upward in an essentially vertical direction and which is made in the form of an aerating line, which contains an actuating handle in the region of its extension facing away from the two-position valve.

In order to avoid the generation of a negative pressure within the container, it is proposed that in the region where the aeration line extends through a head portion of the container, a compensating valve be placed in order to aerate the interior space of the container.

A simple design of a device for aerating the interior space of the container can be devised in such a manner that the compensating valve is made from the aerating line and a tube sleeve, which envelops the aerating line, and that the aerating line and the tube sleeve contain recesses, which correspond to each other and which can be disposed in such a manner that they are superimposed on each other or displaced relative to each other.

In order to avoid sealing problems, it is proposed that the outlet be disposed in a region of the container, which region is located in a vertical upward direction.

An embodiment consisting of multiple parts can be provided in such a manner that the discharge hose is supported by a connecting piece, which is held in place by means of a swivel nut in the region of a discharge spout of the container.

A simplified embodiment consists in disposing an aerating element, which extends as far as the interior space of the container inside the discharge hose, which aerating element, in a region of its end facing away from the discharge hose, extends into a vertically higher region of the interior space of the container.

In order to generate a closed system for handling a liquid, it is proposed that the discharge hose be equipped with a connecting thread in the region of its end that faces away from the container.

The ability to operate it with little loss of time is aided by disposing the valve element in such a manner that it can be shifted in a longitudinal direction of the guide element.

Another embodiment consists in that the valve element is disposed in such a manner that it can be rotated with respect to the guide element.

A mechanically strong arrangement is generated if the coupling element can be screwed into the guide element.

It is therefore the objective of the present invention to design a container of the kind referred to in the introduction in such a manner that the discharge behavior of the discharge hose is improved.

This objective is achieved according to the invention in such a manner that the outlet is connected to a two-position valve, which has at least two indexing positions, namely a discharge position and a fill position, and that the two-position valve in the discharge position connects the interior space of the container with the interior space of the hose, and that, in the aerating position, the end of the discharge hose facing the interior space of the container is connected to an environment of the container by way of the two-position valve.

It is a further object of the present invention to design a container of the kind referred to in the introduction in such a manner that it can be emptied only after the closing element is opened in such a way that an uncontrolled discharge of liquid from the container is avoided.

This object is achieved according to the invention in such a way that the closing element is disposed in the region of a connecting piece, into which a coupling element with an end piece can be inserted, that the closing element is constructed as a valve, which is opened when the coupling element is introduced and automatically closed when the coupling element is removed, and that the connecting piece can be closed by a drain plug in the region of its end facing away from the interior space of the container.

By using a two-position valve, which has a discharge position and an aerating position, it is possible to close the container and ventilate the discharge hose in one operation. The air for ventilating the hose is introduced into the interior space of the hose in the region of the end of the hose, which faces the interior space of the container. In this manner, the liquid present in the hose is discharged quietly and quickly from the hose.

By placing the closing element in the region of the connecting piece in such a manner that an opening of the closing element can only become possible after the coupling element has been inserted into the connecting piece, a defined discharge process will be provided, which, for example, can be directed into a container provided for this purpose. By means of the combination of the closing element with the drain plug, a double measure of security is being provided, which has the effect that even in the case of a defective closing element or if the drain plug is lost, an uncontrolled discharge of the liquid which is present inside the container is avoided.

BRIEF DESCRIPTION OF THE DRAWINGS

In the drawing, examples of the embodiments of the invention are shown schematically. The figures show the following.

DESCRIPTION OF THE PREFERRED EMBODIMENT

Figure 1:
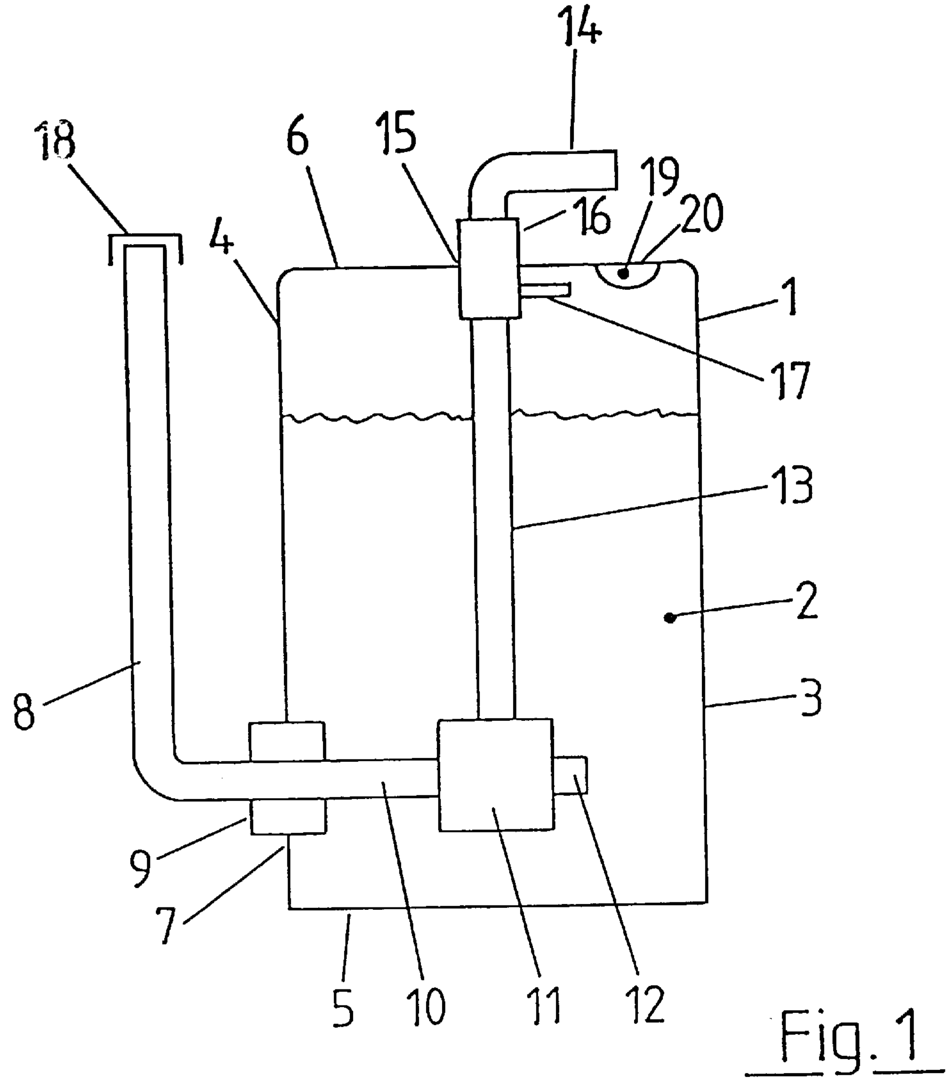
FIG. 1 A basic illustration of a cross-section through a container with a two-position valve, where the discharge hose opens into the container in a lower portion of the container, FIG. 2 a horizontal section through the two-position valve, FIG. 3 a cross-section through an aerating valve for the interior space of the container, FIG. 4 a partial presentation of a cross-section through a container with a discharge hose, which is positioned in a vertically upward direction, FIG. 5 a cross-section through a tire placed upon a wheel rim, where the container is disposed inside the wheel rim, FIG. 6 a cross-section through a closing element for a container which stores liquids, FIG. 7 a cross-section through a further container with a discharge hose, which opens into vertically lower region of the container, FIG. 8 a partial presentation of a container in the region of a discharge spout
and FIG. 9 a view of a container with attached closing elements in the region of an aerating opening and a discharge opening.

According to the embodiment in FIG. 1, the container (1) has been provided with an interior space (2), which is enclosed by a container wall (3). The container wall (3) consists of a side wall (4), a bottom (5) as well as a head portion (6). An opening (7) is disposed in a vertically lower region of the side wall (4), through which a discharge hose (8) is placed. The discharge hose (8) is sealed with respect to the wall of the container (3) by means of a sealing element (9). It is also conceivable to attach the discharge hose (8) on the outside to a connecting piece, which is in turn attached to the side wall (4) in the region of the through-passage (7).

An extension (10) of the discharge hose (8), has the configuration of a connecting piece, and extends into the interior space (2) of the container. A two-position valve (11) is disposed within container (1) at the inner end of extension (10) and is fluidly connected to the interior space (2) of the container by way of an inlet (12). Valve (11) is also connected to the exterior of container (1) by means of an aerating line (13). Aerating line (13) is constructed as a tube, which protrudes from the container (1) through the head portion (6) and includes an actuating lever (14) in the form of a bent portion.

A compensating valve (15) may also be provided in aerating line (13) in the region of the head portion (6), through which an aeration process of the interior space (2) of the container can take place. The compensating valve (15) can, for example, be fashioned from a tube sleeve (16), which includes an aerating outlet (17). In particular, it is further being contemplated to connect the two-position valve (11) and the compensating valve (15) to each other by means of the aerating line (13) in such a manner that, when the discharge hose (8) is connected to the interior space (2) of the container, an aeration of the interior space (2) of the container takes place—likewise by means of the compensating valve (15)—and that, if the two-position valve (11) is operated in such a way that an aeration of the discharge hose (8) is carried out, a further aeration of the interior space (2) of the container by way of the compensating valve (15) is avoided. In this manner, a hermetic separation of the interior space of the container is ensured when the container (1) is in a closed position.

In accordance with the embodiment in FIG. 1 it may also be contemplated to equip the end of discharge hose (8) remote from the container (1), with a detachable sealing cap (18). The sealing cap (18) can be equipped with an internal thread, which can be threaded onto an external thread of the discharge hose (8). In order to make it easier to handle the container (1), a recessed grip (19) has been disposed in the region of the head portion (6). A handle (20) extends through the recessed grip (19).

Figure 2:
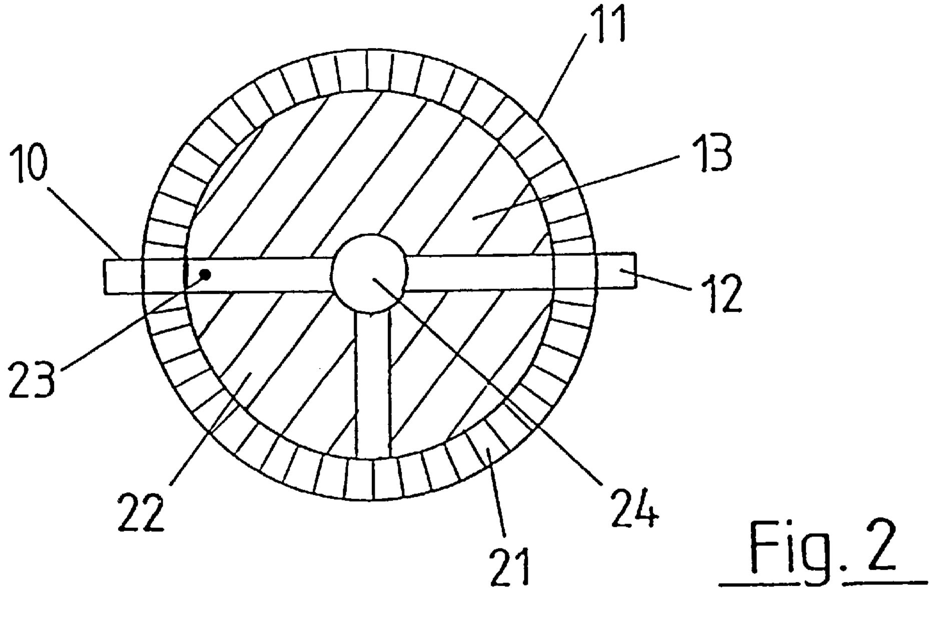

FIG. 2 shows in cross-section a possible embodiment of the two-position valve (11). In a housing (21) a valve cone (22) is disposed, which can be rotated by way of the aerating line (13). In order to connect the extension (10) with the inlet (12), the valve cone (22) contains a liquid through-passage (23), which connects the inlet (12) with the extension (10) in a defined angular position of the valve cone (22). In another angular position, which corresponds to an aerating position of the two-position valve (11), the aerating line (13) is connected to the extension (10) by way of an aerating bore (24) inside the valve cone (22) and radial passage **(24*a*). In this position, an aeration of the discharge hose (8) takes place but extension (10) and hose (8) are not in fluid communication with inlet (12)**.

Figure 3:
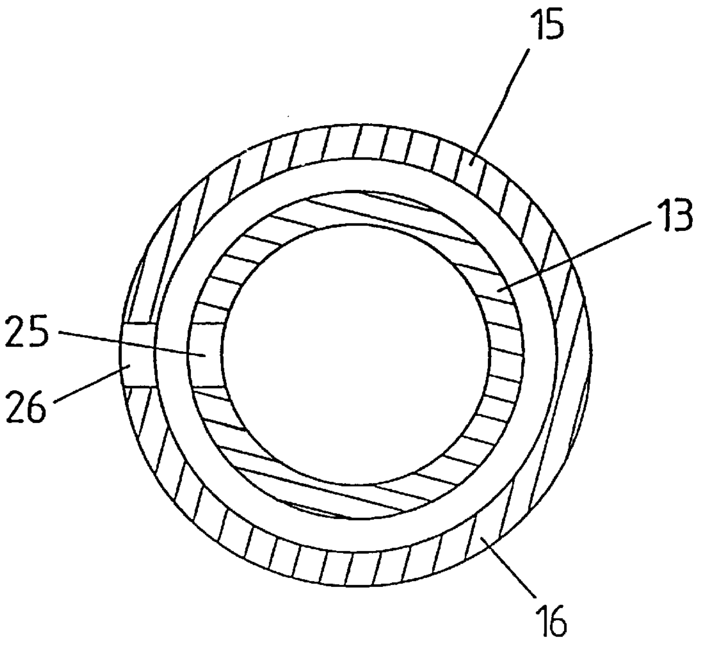

The compensating valve (15) is shown in cross-section in FIG. 3. It can be seen, that the aerating line (13) is extended through the tube sleeve (16). The line (13) contains a recess (25), which corresponds to a defined rotational position of the aerating line (13) relative to a recess (26), which is disposed in the region of the tube sleeve (16). In this rotational position, an aeration of the interior space (2) of the container takes place.

Figure 4:
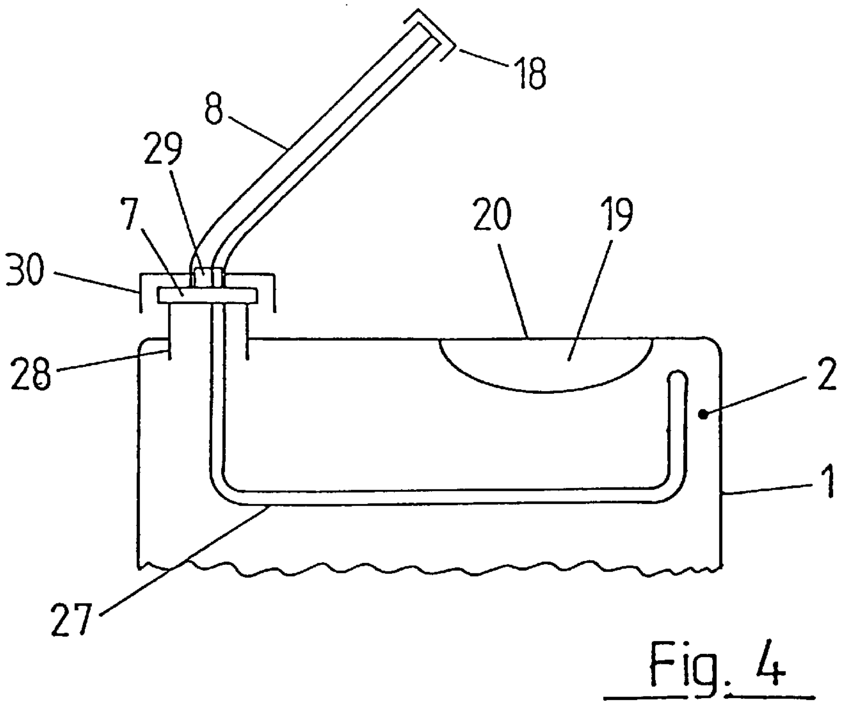

A container (1), which is equipped with the discharge hose (8) in the region of its vertically upward extension, is shown in FIG. 4. An aerating element (27) has been integrated into the discharge hose (8), which—in the region of its end remote from the discharge hose (8)—opens into a vertically upward region of the interior space (2) of the container. An attachment of the discharge hose (8) in the region of the container (1) can, for example, be accomplished in such a manner that a connecting piece (29) is disposed in the region of a discharge tube (28), which connecting piece is held in place by means of a swivel nut (30) and onto which the discharge hose (8) is fitted.

Figure 5:
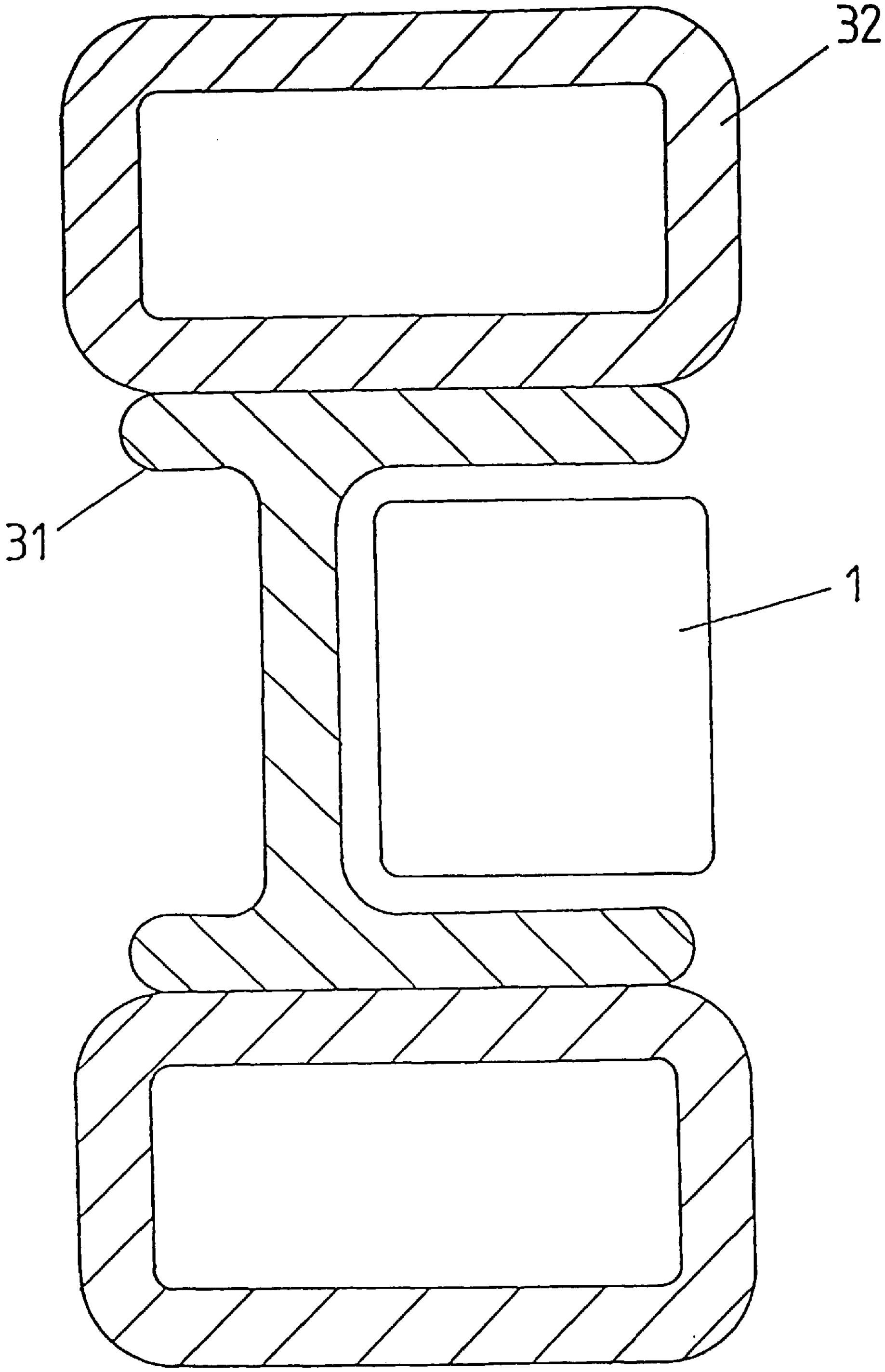

FIG. 5 shows a special embodiment, where the container (1) is disposed in the region of a wheel rim (31) which supports a tire (32). The container (1) is of a rounded construction in such a way that it can be inserted into an interior space generated by the wheel rim.

Figure 6:
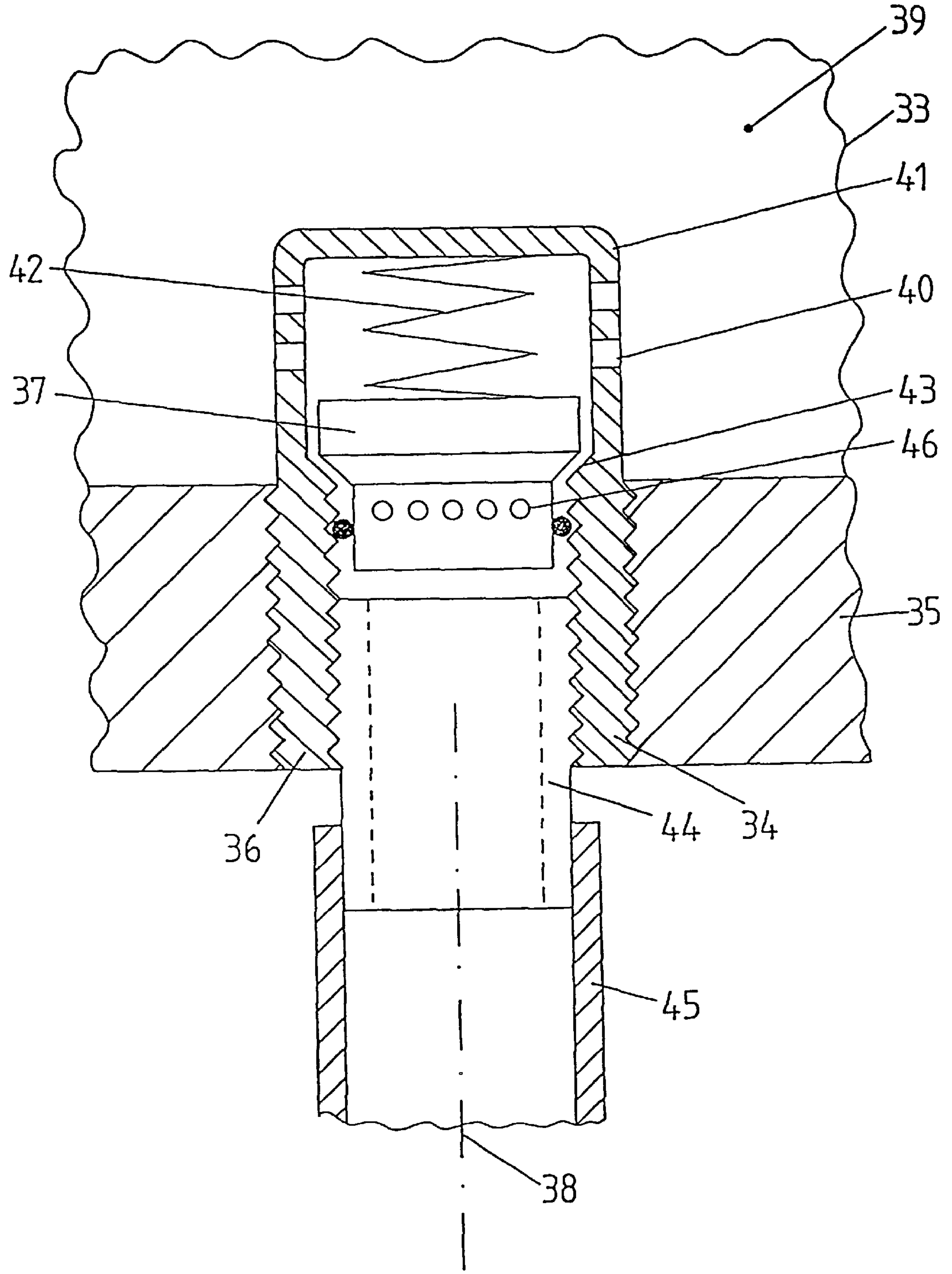

In FIG. 6, a storage container (33) is shown, which contains an outlet (34), disposed in a vertically lower region of the storage container (33). In particular, it has been contemplated that the discharge opening be placed in the bottom portion (35) of the storage container (33). The outlet (34) consists essentially of a guide element (36), which has been screwed into the bottom portion (35), as well as a valve element (37), disposed in such a manner that it can be moved with respect to the guide element (36). In accordance with the embodiment of FIG. 6, the valve element (37) is positioned in such a manner that it can be displaced in a longitudinal direction (38) from the outlet. The guide element (36) has been provided with an outer thread, which meshes with an inner thread of the bottom portion (35). A cap (41) equipped with recesses (40) is disposed in the interior space (39) of container (33) as an extension of guide element (36). In the cap (41) a spring (42) is located, which pushes the valve element (37) against a valve seat (43) of the guide element (36).

The guide element (36) has been additionally provided with an internal thread, which is engaged by the coupling element (44) by means of its external thread. The coupling element (44) is equipped with a connecting hose (45). When the coupling element (44) is screwed in, the valve element (37) is lifted and, in the process, it opens up a through-passage from the interior space (39) of the container in the direction of the connecting hose (45). By means of recesses (46) in the region of the valve element (37) a passage of the liquid can be further facilitated. An additional sealing action can be achieved by means of a gasket (58).

In particular it is being contemplated to equip the container (1) with a connecting hose (45) in such a manner that a connection to the storage container (33) is possible. For example, the storage container (33) can take the form of the oil pan of a vehicle, from which used oil is to be drained. When the connecting hose (45) is connected by means of its coupling element (44), the valve element (37) opens up after the coupling process has been carried out and the used oil runs directly into the container (1). Environmental contamination due to the oil, which misses its target by dripping or running out, can be eliminated with a high degree of dependability.

Figure 7:
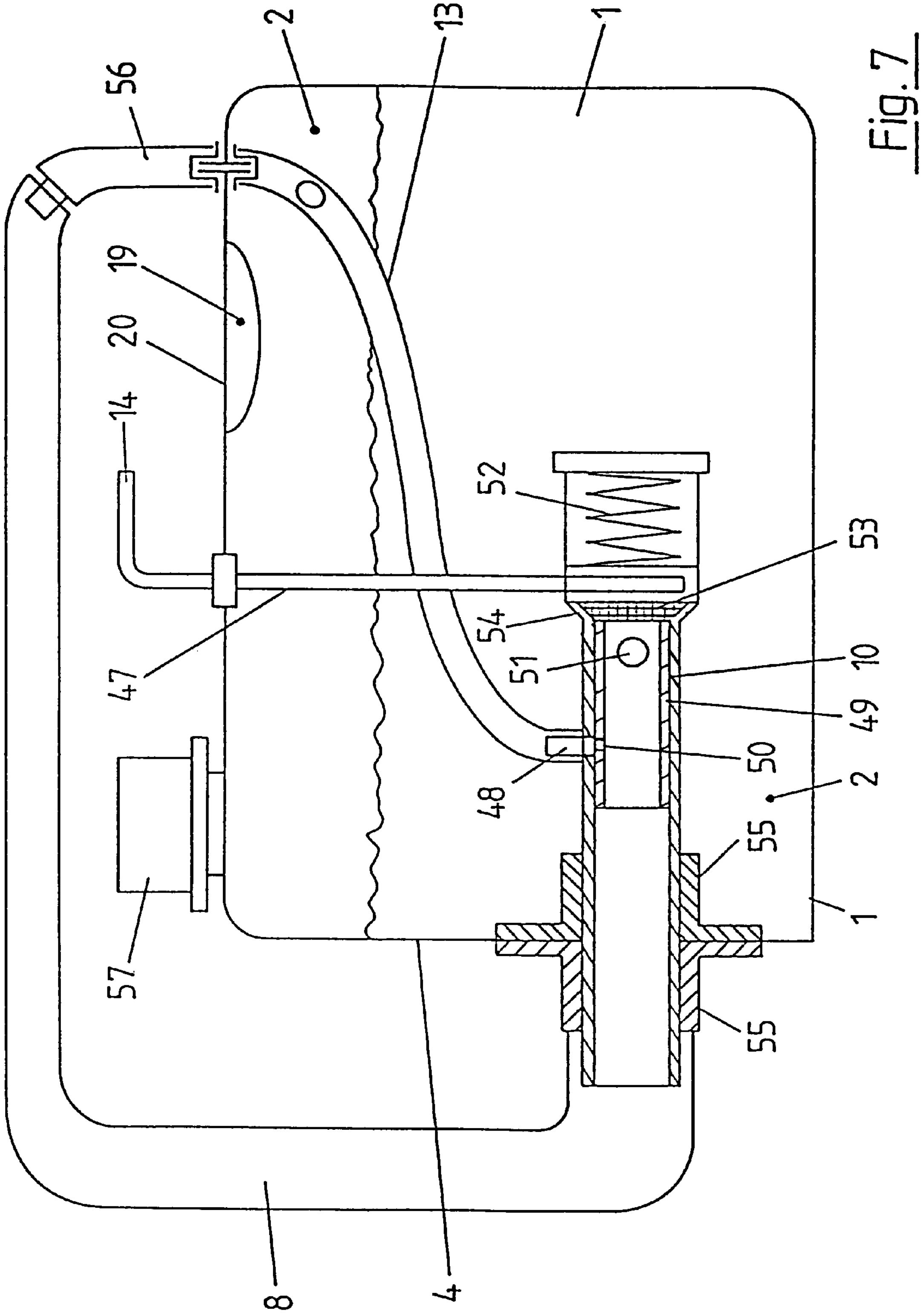

FIG. 7 shows a further variant to the container (1). In this case the aerating line (13) does not perform any operating function. Rather, a separate actuating rod (47) has been provided, which is attached to the actuating handle (14). The aerating line (13) opens into the extension (10) in the region of a connecting piece (48). In the extension (10), a positionable valve tube (49) is provided, which is equipped with an aerating bore (50) and an exit hole (51). A compression spring (52) exerts a force on a valve cone (53)—which is connected to a valve tube (49)—in the direction of a valve seat (54), which has been molded onto the extension (10).

The extension (10), which has been fashioned as an outer valve tube, is mounted by means of a screw connection (55) in the region of the side wall (4) of the container (1). The discharge hose (8) can be pushed with its end piece onto the connecting piece (56) of the container (1). In the region of the connecting piece (56), the aerating line (13) opens into a connecting piece through the discharge hose (8). The container includes a sealing cap (57). Beyond this, a handle recess (19) and a handle (20) are contemplated.

One use of the container (1) illustrated in FIG. 7 takes place in such a manner that the discharge hose (8) is at first removed from the connecting piece (56), and that subsequently the valve cone (43) is lifted off the valve seat by means of a rotary motion of the actuating rod (47) against the force of the compression spring (52).

As a result of the displacement of the valve tube (49), the aerating line (13) will be blocked. Liquid which is present inside the container (1), can flow out of the discharge hose (8). An aeration of the interior space (2) of the container takes place alignment with the connecting piece (56).

In order to terminate the discharge process, the valve cone (53) is again displaced in the direction of the valve seat with the aid of the actuating rod (47). By doing this, the aerating bore (50) is likewise positioned in the connecting piece (48), so that an aeration of the discharge hose (8) by a path through the aerating hose (13) can take place. After the discharge hose (8) has been emptied, it can once again be attached to the connecting piece (56). As a consequence of this action the container is closed. Thus, it can also be opted to convey liquid to be removed or aerating air into the region of the discharge hose (8).

As an alternative to the aerating hose (13) inside the container (1) depicted in FIG. 7, it is also possible to provide an external aerating hose (13). This could be extended, starting from a connecting piece, along the side wall (4) of the container (1) and it could open into the interior space (2) of the container (1) in a vertically upward region of the container (1).

The connecting piece is preferably disposed in the region of the tube-shaped extension (10), which protrudes from the interior space (2) of the container.

Figure 8:
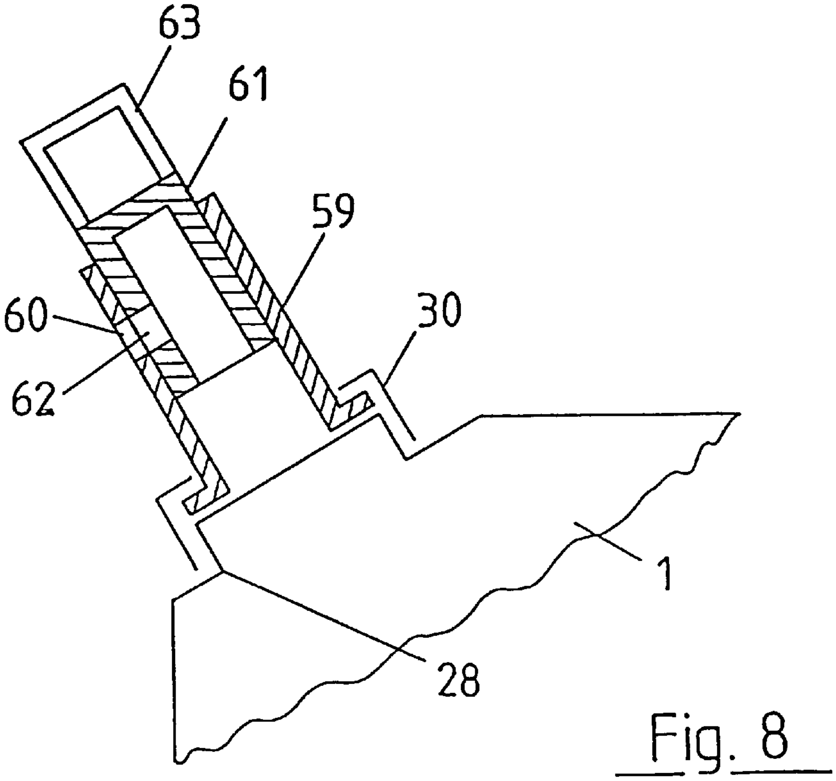

FIG. 8 shows another embodiment of the invention. In it, all the elements of the invention which are essential to its function are disposed A. In A, a discharge spout (59) is held in place by the swivel nut (30) fitted to discharge connecting piece (28). The discharge spout (59) is equipped with a discharge opening (60) in its sidewall. Inside the discharge spout (59) a valve element (61) has been placed in such a manner that it can be rotated. Essentially, the valve element (61) has a tube-shaped profile, which contains a through-passage (62). The end of valve element (61) facing away from the container (1) is closed and equipped on the outside with an actuating handle (63). In the position of the valve element (61) shown in FIG. 8, the through-passage (62) and the discharge opening (60) are disposed in such a manner that they overlap, so that a discharge process can be carried out. Correspondingly, it is also possible to provide for an appropriate aeration of the container (1).

Figure 9:
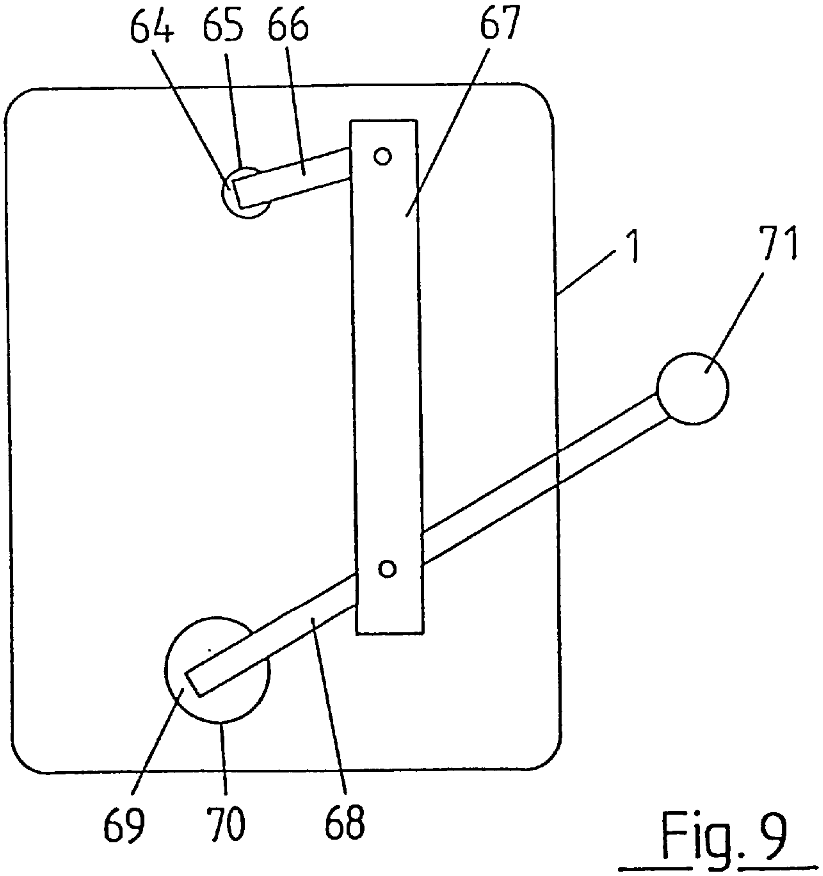

FIG. 9 shows a further variant. Here, the container (1) is equipped with a separate aerating opening (64), which must be sealed by a pre-adjustable closing element (65). The closing element (65) is connected to a lever (66) by means of a linkage (67), which is connected by way of a lever (68) to a discharge aperture (69), which can be closed by a closing element (70). For actuating it, a handle (71) is contemplated. With regard to the function of closing and opening the aperture, an embodiment comparable to that of FIG. 8 is contemplated. By means of the linkage (67), a coupling process is effected in such a manner that when liquid is removed from the container (1) through the discharge aperture (69), an aeration likewise takes place through the aerating opening (64). After placing the handle (10) in a locking position, the discharge aperture (69) as well as the aerating opening (64) are closed.

In the design of the two-position valve according to FIG. 2, it has been contemplated in particular to provide—in a position, where it has been rotated by 90° with respect to that of FIG. 2 and where a through-passage for the liquid originating from the inlet (12) has been blocked in the direction of the extension (10)—for a connection between the aerating bore (24) and the extension (10) through the bore within the valve cone (22), which points downward in FIG. 2.

As an alternative to a pure rotational mobility of the two-position valve (11), it is also possible to provide in accordance with FIG. 7 for a longitudinal mobility of the parts which are guided telescopically within each other. In order to make any aeration of the discharge hose (8) dispensable, if need be, a variant has also been contemplated, where the closing valve is disposed at the end of the hose (8).

A variant to the arrangement of the aerating element (27) in FIG. 4 consists in fashioning the aerating element (27) as a flexible hose, which is guided by a float in the region of its end, for example a styrofoam element or a hollow body. This ensures that one end of the aerating element (27) is always located in that region of the container (2) which is filled with air. Another variant for a design of the two-position valve (11) consists in guiding a closing piston inside a cylindrical housing. The wall of the cylinder contains two openings, of which one opens into the interior space (2) of the container and the other is attached to the discharge hose (8).

In a closed position of the two-position valve (11), the piston closes off the connection between the openings for a through-passage of liquid. However, at the same time, the discharge hose (8) is provided with an aerating line (13) in the region of the piston by way of a bore or a recess. After a longitudinal displacement of the piston, the connecting path between the openings in the region of the cylinder wall is opened, and the recess or the bore for the aeration is displaced relative to the piston in such a manner, that a shut-off action is effected. As a further possibility, it is conceivable to attach a compensating valve (15) to the aerating line (13) according to FIG. 1, and to initiate an aeration of the interior space (2) of the container at the same time, when the piston is placed in the opening position for allowing the passage of liquid. When the piston is placed in the closed position, instead of an aeration of the interior space (2) of the container an aeration of the discharge hose (8) takes place following the longitudinal displacement.

In accordance with a further variant, the discharge hose (8) is connected to a valve, which protrudes into the interior space (2) of the container, which valve consists of two tubes which are telescoped into one another. The outer tube contains a longitudinal slot and, in an upper region, it contains an aerating bore. To the aerating bore, an aerating hose which contains a float for positioning it inside the interior space (2) of the container, can be connected. The inner tube contains a longitudinal slot merely in its lower region. The typical entry opening of the inner tube is closed in its lower region. It would be useful to provide the inner tube with a slot of a length of about 5 cm.

The combination of the inner tube and the outer tube provides for an automatic dosing device. For this purpose, the inner tube can be longitudinally displaced as well as rotated within the outer tube. In order to carry out a closing process, the inner tube is initially pulled out of the outer tube by a sufficient distance. In this position, the longitudinal slots are rotated out of alignment with respect to one another and no liquid can run out of the container. If the inner tube is subsequently rotated to such an extent that the slots of the inner and the outer tubes are superimposed upon one another, then liquid can run out of the interior space (6) of the container until, with the container placed in the corresponding positioning, the lower edge of the slot in the inner tube has been reached. In this position, aerating holes, which have been provided in the region of the inner and the outer tube, are positioned above each other, so that an aeration of the interior space (2) of the container can take place in accordance with the already described functional mode.

The amount of liquid which is discharged, is determined by the distance by which the inner tube is pulled out of the outer tube. In particular, it is also being contemplated to provide the inner tube with an appropriate scale, which becomes visible when the tube is pulled out. Thus, it is possible, for example, to establish an initial dose of 2 liters, and after the termination of this dosing process, to pull the inner tube farther out of the outer tube in order to generate an additional dose of 3 liters. The dosing processes can be continued until the interior space (2) of the container has been emptied.

In this embodiment, the container (1) is preferably constructed in such a manner that in its basic form the inner and the outer tubes protrude upward from the container. After an appropriate positioning of the tubes with respect to each other, the container is rotated and the liquid can be discharged. But alternatively it is also conceivable that the tubes exit laterally from the container or that the container (1) is constructed as a stationary unit, which—in the vertically lower region of its extension—is equipped with transversely or vertically oriented tubes.

In order to ensure an adequate aeration, it has been contemplated in particular to provide the aerating line with a multiplicity of aerating bores along its length, where it is extended in the interior space of the container. By this means, an adequate aeration in a multiplicity of positions can be provided. The aerating hose can be effectively connected by means of a connecting piece. In order to avoid any penetration of the liquid into the aerating hose when the interior space (2) of the container is filled to a significant degree, it is possible to place a flapper valve in the region of the float, which prevents any liquid from entering.

In a further variant of the invention it is possible to utilize the sealing cap of the container (1) as a valve. Into a fitting-like connecting piece of the container (1), which is equipped with an internal thread, a coupling element with an external thread is threaded. The fitting extends into the interior space (2) of the container and it is connected to an aerating tube or an aerating hose with a float. Recesses have been arranged in the fitting and in the coupling piece, which recesses correspond to each other, and which ensure, when they are placed in a certain angular position, that a removal of liquid and an aeration process take place at the same time, and when they are arranged in a different angular position, they interrupt the aeration process as well as the removal of liquid. In this manner, the container is adequately sealed off when it is not being used. It is useful to place the aerating line within the discharge hose (8).

In principle it is also possible that the fitting of the container (1) may extend to the outside. In this case, it is useful to provide the fitting with an external thread, onto which a hat-shaped coupling piece, which includes an aerating line for the discharge hose, will be pushed. Here, too, the aerating bores and discharge recesses, which correspond to each other, are disposed in a manner that has already been described.

A further possibility for effecting an automatic dosing process with an internal and an external tube consists in locating a spiral-shaped circumferential slot in the region of one of the tubes. The amount of the dosage will then be determined by the rotary positioning. Thus, no longitudinal movement will be required.

I claim:

1. A container for liquids, which is equipped with an outlet, to which one end of a discharge hose with an interior hose space can be connected, and where the outlet is located in a container wall which encloses an interior space of the container, and where a connecting piece includes a through-passage leading to the interior space of the container, characterized in that the outlet is connected to a valve (11) disposed within said container and movable between a first discharge position and a second aerating position, said valve being operative to connect the interior space (2) below the level of said liquid in the container with the interior space of the hose, when in said first discharge position and to connect said discharge hose adjacent said one end to an area outside the container when in said second aerating position, said interior space of said container above the level of said liquid being connected to an area outside said container when said valve is in said first position.

2. A container according to claim 1, characterized in that the outlet is disposed in a lower vertical portion of the container.

3. A container according to claim 1, characterized in that the two-position valve (11) is disposed in a lower vertical portion of the container.

4. A container for liquids, which is equipped with an outlet, to which one end of a discharge hose with an interior hose space can be connected, and where the outlet is located in a container wall which encloses an interior space of the container, and where a connecting piece includes a through-passage leading to the interior space of the container, characterized in that the outlet is connected to a valve (11), movable between a first discharge position and a second aerating position, said valve being operative to connect the interior space (2) of the container with the interior space of the hose, when in said first discharge position and to connect said discharge hose adjacent said one end to an area outside the container when in said second aerating position and a tube is provided for the actuation of the two-position valve (11), which tube extends in a substantially vertical upward direction and which acts as an aerating line (13), which contains an actuating handle (14) in the region of its extension, which faces away from the two-position valve (11).

5. A container for liquids, which is equipped with an outlet, to which one end of a discharge hose with an interior hose space can be connected, and where the outlet is located in a container wall which encloses an interior space of the container, and where a connecting piece includes a through-passage leading to the interior space of the container, characterized in that the outlet is connected to a valve (11), movable between a first discharge position and a second aerating position, said valve being operative to connect the interior space (2) of the container with the interior space of the hose, when in said first discharge position and to connect said discharge hose adjacent said one end to an area outside the container when in said second aerating position; an aerating line extending through a head portion of the container and a compensating valve (15) disposed in the region of a through-passage of the aerating line (13) through a head portion (6) of the container (1) for the purpose of aerating the interior space (2) of the container.

6. A container according to claim 5, characterized in that the compensating valve (15) is formed by the aerating line (13) and a tube sleeve (16), which envelopes the aerating line (13), and that the aerating line (13) and the tube sleeve (16) contain recesses (25, 26), which correspond to each other, and which can be disposed in such a way that they are superimposed upon each other as well as in a manner where they are displaced relative to each other.

7. A container according to claim 1, characterized in that the outlet is disposed in a region of the container, which is located in a vertically upward direction.

8. A container according to claim 7, characterized in that the discharge hose (8) is held in place by a connecting piece (29), which is held in place by a swivel nut (30) in the region of a discharge spout (28) of the container.

9. A container for liquids, which is equipped with an outlet, to which a discharge hose with an interior hose space can be connected, and where the outlet is located in a container wall which encloses an interior space of the container, and where a connecting piece includes a through-passage leading to the interior space of the container, characterized in that the outlet is disposed in an upper portion of said container and is connected to a two-position valve (11), which has at least two indexing positions, namely a discharge position and an aerating position, and that when the two-position valve (11) is in the discharge position, it connects the interior space (2) of the container with the interior space of the hose, and that in the aerating position, the end of the discharge hose (8), which faces the interior space (2) of the container, is connected by way of the two-position valve (11) to an area outside the container, said discharge hose being connected to said outlet by a connecting piece (29) which connecting piece is held to said outlet by a swivel nut (30) and an aerating element (7) disposed inside the discharge hose (8), and extending into the interior space (2) of the container, and which in the region of its end which faces away from the discharge hose (8) extends into a vertically higher region of the interior space (2) of the container.

10. A container according to claim 9, characterized in that the discharge hose (8) is equipped with a connecting thread in the region of its end which faces away from the container (1).

11. A container for liquids, which is equipped with an outlet, which, in the vertically lower region of an extension of the container wall, opens into an interior space of a container, characterized in that a guide element is fitted into said outlet, a closing element is movably disposed entirely within said guide element (36), a coupling element (44) with an end piece can be introduced into said guide element, that the closing element is constructed as a valve element (37), which is opened when the coupling element (44) is inserted and which is automatically closed when the coupling element (44) is removed, said guide member including a valve seat and said valve member being engageable with said valve seat when closed, and that the guide element (36) can be closed by means of a drain plug in the region of its end, that faces away from the interior space (39) of the container and a hose (45) having one end connected to said coupling element and a two-position valve (11) connected to the other end of said hose; said two position valve being adapted to enable said hose to be connected with a second container;

said two-position valve (11) having a first position, connecting the interior space of the hose with an interior space of the second container and a second position, connecting the inside of the hose with the outside of the first and the second container to enable an aerating of the hose, said two position valve being operative to connect the interior of said hose with the interior of said second container when in a first position and the interior space of said container above the level of said liquid is connected to an area outside said second container when said valve is in said first position.

12. A container according to claim 11, characterized in that the valve element (37) is disposed in such a manner that it can be moved in a longitudinal direction (38) of the guide element (36).

13. A container according to claim 11, characterized in that the valve element (37) is disposed in such a manner that it can be rotated with respect to the guide element (36).

14. A container according to claim 13, characterized in that the coupling element (44) can be threaded into the guide element (36).

15. A container according to claim 2, characterized in that the two-position valve (11) is disposed in a lower vertical portion of the container.

16. A container for liquids, which is equipped with an outlet, to which one end of a discharge hose with an interior hose space can be connected, and where the outlet is located in a container wall which encloses an interior space of the container, and where a connecting piece includes a through-passage leading to the interior space of the container, characterized in that the outlet is connected to a valve (11), movable between a first discharge position and a second aerating position, said valve being operative to connect the interior space (2) of the container with the interior space of the hose, when in said first discharge position and to connect said discharge hose adjacent said one end to an area outside the container when in said second aerating position, the outlet is disposed in a lower vertical portion of the container, the two-position valve (11) is disposed in a lower vertical portion of the container and a tube is provided for the actuation of the two-position valve (11), which tube extends in a substantially vertical upward direction and which acts as an aerating line (13), which contains an actuating handle (14) in the region of its extension, which faces away from the two-position valve (11).

17. A container according to claim 16, characterized in that a compensating valve (15) is disposed in the region of a through-passage of the aerating line (13) through a head portion (6) of the container (1) for the purpose of aerating the interior space (2) of the container.

18. A container according to claim 17, characterized in that the compensating valve (15) is formed by the aerating line (13) and a tube sleeve (16), which envelopes the aerating line (13), and that the aerating line (13) and the tube sleeve (16) contain recesses (25, 26), which correspond to each other, and which can be disposed in such a way that they are superimposed upon each other as well as in a manner where they are displaced relative to each other.

19. A container according to claim 18, characterized in that the outlet is disposed in a region of the container, which is located in a vertically upward direction.

20. A container according to claim 19, characterized in that the discharge hose (8) is held in place by a connecting piece (29), which is held in place by a swivel nut (30) in the region of a discharge spout (28) of the container.

21. A container for liquids according to claim 1 wherein said valve operates to connect said interior of said container above said level of said liquid to an area outside said container when said valve is in said first position.

22. A container for liquids, which is equipped with an outlet, to which one end of a discharge hose with an interior hose space can be connected, and where the outlet is located in a container wall which encloses an interior space of the container, and where a connecting piece includes a through-passage leading to the interior space of the container, characterized in that the outlet is connected to a valve (11) movable between a first discharge position and a second aerating position, said valve being operative to connect the interior space (2) below the level of said liquid in the container with the interior space of the hose, when in said first discharge position and to connect said discharge hose adjacent said one end to an area outside the container when in said second aerating position, said interior space of said container above the level of said liquid in said container being connected to an area outside said container when said valve is in said first position by an aerating line (13) which is arranged with one end connected to said valve and the other end positioned adjacent the wall of the container and at a level higher than a level of liquid in the interior of said container.

* * * * *

UNITED STATES PATENT AND TRADEMARK OFFICE

CERTIFICATE OF CORRECTION

PATENT NO. : 5,947,154

DATED : September 7, 1999

INVENTOR(S) : Friedrich Fischer

It is certified that error appears in the above-indentified patent and that said Letters Patent is hereby corrected as shown below:

Column 5, line 64, delete "which has been".

Column 6, line 17, "alignment with" should be --through--.

Column 6, line 21, after "in" insert --alignment with--.

Column 6, lines 27-28, delete "in the region of".

Column 6, line 42, "A." should be --in the region of the discharge connecting piece (28).--.

Column 6, line 42, "In A, a" should be --A-.

Signed and Sealed this

Nineteenth Day of September, 2000

*Attest:*

Q. TODD DICKINSON

*Attesting Officer*

*Director of Patents and Trademarks*